Figure 1:
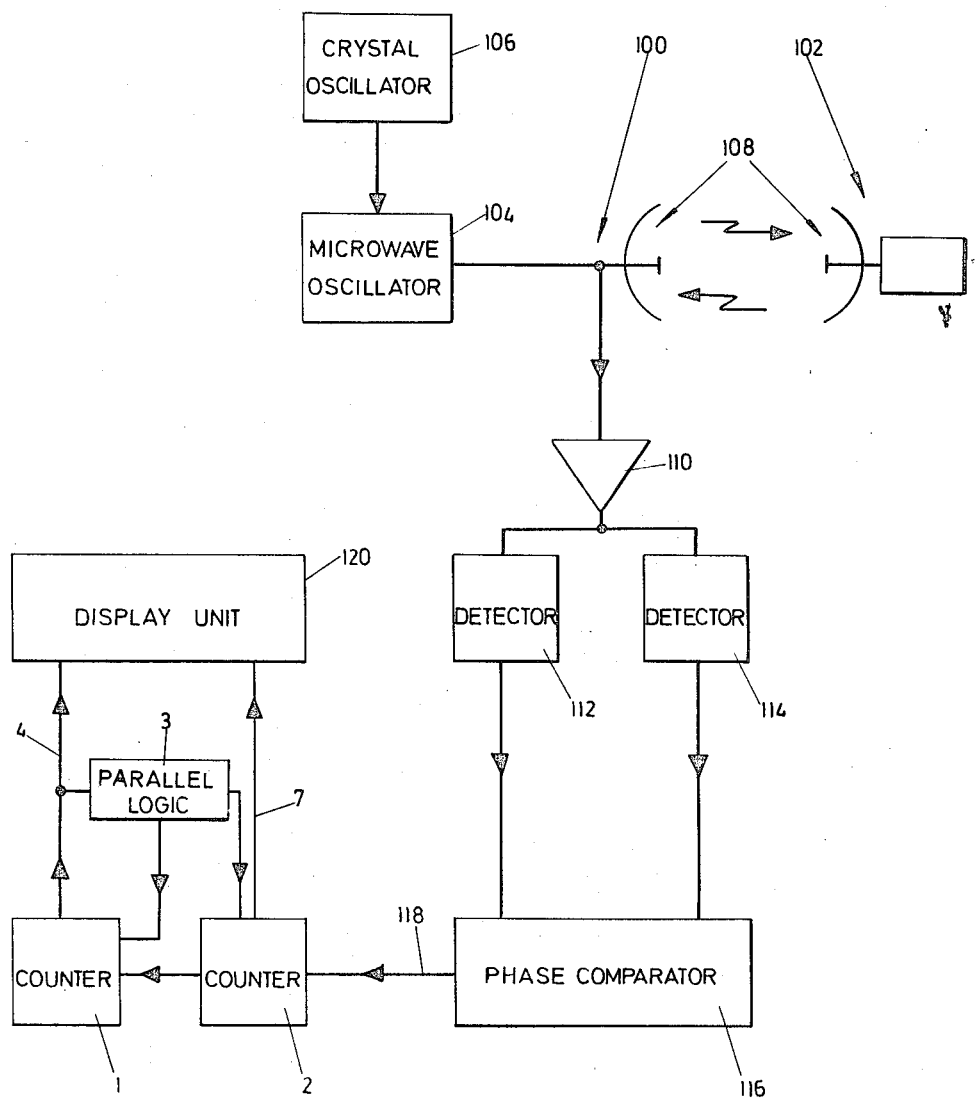

United States Patent [19]

Cabion

[11] 3,854,133

[45] Dec. 10, 1974

[54] ELECTRO-MAGNETIC DISTANCE MEASURING APPARATUS

[75] Inventor: Paul Joseph Cabion, Johannesburg, South Africa

[73] Assignee: South African Inventions Development Corporation, Pretoria, South Africa

[22] Filed: May 29, 1973

[21] Appl. No.: 364,285

[30] Foreign Application Priority Data

May 29, 1972 South Africa.................... 72/3648

[52] U.S. Cl.............................................. 343/12 R
[51] Int. Cl.............................................. G01s 9/04
[58] Field of Search................................ 343/12 R

[56] References Cited
UNITED STATES PATENTS

| | | | |
|---|---|---|---|
| 2,907,999 | 10/1959 | Wadley | 343/12 R |
| 3,078,460 | 2/1963 | Werner et al. | 343/12 R |
| 3,229,285 | 1/1966 | Wadley | 343/12 R |
| 3,241,139 | 3/1966 | Wadley | 343/12 R |
| 3,243,811 | 3/1966 | Hose | 343/12 R |
| 3,300,780 | 1/1967 | Mason | 343/12 R |
| 3,614,226 | 10/1971 | Vergoz | 343/12 R |
| 3,680,101 | 7/1972 | Granquist | 343/12 R |

Primary Examiner—Maynard R. Wilbur
Assistant Examiner—G. E. Montone
Attorney, Agent, or Firm—Young & Thompson

[57] ABSTRACT

In an electro-magnetic distance measuring instrument of the type in which a distance between two points is inferred from a knowledge of the transit time of an electro-magnetic wave by means of a series of phase measurements taken with waves of decreasing effective frequency, apparatus for automatically deriving a final distance from such a series of measurements. These phase measurements have two digits, are subject to errors and are taken with waves having effective frequencies related by powers of ten. The apparatus of the invention operates sequentially on measurements due to waves of decreasing effective frequency by adding a number which may be either four or five to, and subtracting the magnitude of the tens digit of the preceding measurement from a new measurement. This operation corrects the tens digit of the new measurement for any error which may have occurred during measuring, so that it can be used as one of the digits in the final result.

9 Claims, 2 Drawing Figures

ELECTRO-MAGNETIC DISTANCE MEASURING APPARATUS

This invention relates broadly to electro-magnetic distance measuring apparatus.

In electro-magnetic distance measuring, the transit time of an electro-magnetic wave between stations positioned at the ends of a line to be measured is measured by determining the phase-shift which the wave undergoes in a round trip from one station to the other and back. The distance is inferred from the measured time and a knowledge of the velocity of propagation of the wave under the prevailing atomospheric conditions. One instrument which performs this operation is a Tellurometer.

Since phase can only be resolved with a limited accuracy, accurate measurement of a time requires that the wave have a high frequency. Determining the phase shift between the outgoing and incoming waves having such a high frequency does not indicate the round trip time however, since this time may total an unknown number of wave periods plus that time indicated by the measured phase shift. Thus the indication of time (or distance) obtained using a high frequency wave is not only highly accurate but also highly ambiguous. In order to resolve this ambiguity, phase shift is measured with waves having, effectively, lower frequencies. The resulting measurements have lesser accuracies but also less ambiguities.

In practical instruments, the waves usually have effective frequencies related by powers of ten, and the phases are resolved to 1 percent. Thus measurement of a line results in a set of readings usually known as patterns, each having two digits, the digit of greater significance in a particular reading having the same significance as the digit of lesser significance in a reading obtained using a wave having a frequency of one tenth of that of the wave used to obtain the first mentioned reading. Since the phases are measured with only a limited accuracy (usually better than ±5 percent in practical instruments) the above-mentioned digits having the same significance do not necessarily agree so that the second reading must be adjusted in order to make them agree. This procedure is known as fitting the patterns, and in known instruments is effected manually by the operator.

In such an instrument, a final time (corresponding to a distance), is inferred from a series of these phase measurements taken with progressively decreasing effective pattern frequencies. As indicated above, the phase is obtained to a precision of 1 percent and an accuracy of better than ±5 percent, with pattern frequencies related by powers of 10.

For example, suppose the actual distance to be measured is 99,000 metres. A representative set of measurements might be:

| | |
|---|---|
| 1st phase measurement reads | 00 (which is correct) |
| 2nd phase measurement reads | 95 (which is 5% low) |
| 3rd phase measurement reads | 00 (which is correct) |
| 4th phase measurement reads | 04 (which is 4% high) |
| 5th phase measurement reads | 85 (which is 5% low) |
| 6th phase measurement reads | 03 (which is 4% high) |

In the case of a conventional Tellurometer, the final distance is inferred manually according to the following procedure:

All phases following the first are treated sequentially by adding or subtracting the least number to make the least significant digit of the particular phase measurement agree with the most significant digit of the previous measurement. The most significant digit is then correct and any carry is neglected. In known instruments a negative error of 5 is considered to be more likely than a positive error of 5, so that five must be added in cases of doubt. This means that a particular measurement is adjusted to the nearest value having its least significant digit in agreement with the most significant digit of the previous measurement, and where two values are equally likely, the lesser value is taken in view of the above-stated assumption that negative error of 5 is more likely than a positive error of 5.

Thus the above example proceeds as follows:

The first phase measurement is written down as the two least significant digits of the final result, thus xxxxx,OO, (where xxxxx represents the part of the result as yet unresolved from the phase measurements) and is assumed to be correct. The second phase measurement is now treated according to the above procedure. Thus, to make the 5 agree with the most significant 0 in the previous measure, 5 can be either added or subtracted, but, as described, must be added in such a case. Addition of 5 gives a result of 00, the carry of 1 being neglected. Thus the most significant 0 is now correct and is the next most significant digit in the result, thus, xxxx0,00. The third phase measurement has its least significant digit in agreement with the most significant digit of the previous measurement and thus the most significant 0 is correct and is the next most significant digit in the result thus, xxx00,00. In the fourth phase measurement, the least number which can be added or subtracted to obtain the required agreement is 4 and it is to be subtracted, giving the corrected phase measurement of 00 and the next most significant digit in the result as 0, thus, xx000,00. The fifth phase measurement requires the addition of 5 according to the procedure and results in a corrected next most significant digit of 9 in the result, thus, x9000,00. In the sixth phase measurement, subtraction could cause the result to become negative unless it is remembered that a carry digit has no significance, making it possible to subtract 4 from 103 to obtain 99 and a most significant digit of 9 in the result, thus, 99000,00 metres.

A detailed exposition of the principles and operation of the Tellurometer is to be found in the Transactions of the South African Institute of Electrical Engineers of May 1958 at p. 143.

It is an object of the invention to provivde a device for processing phase measurements from electromagnetic distance measuring apparatus to indicate the final distance.

A device according to the invention comprises means to accept measurements from the measuring apparatus, means to accumulate those measurements and after the first measurement to add, in a modulo corresponding with the number of digits in a phase measurement and at the weight of the current most significant digit in the partial measure, a correcting quantity to each measurement to allow for error in the measurement, means to control the accumulating means so that the correcting quantity is a predetermined quantity minus the current most significant digit in the partial measure of distance, and means to indicate the final distance.

Further according to the invention, the predetermined quantity is either four or five.

Figure 2:
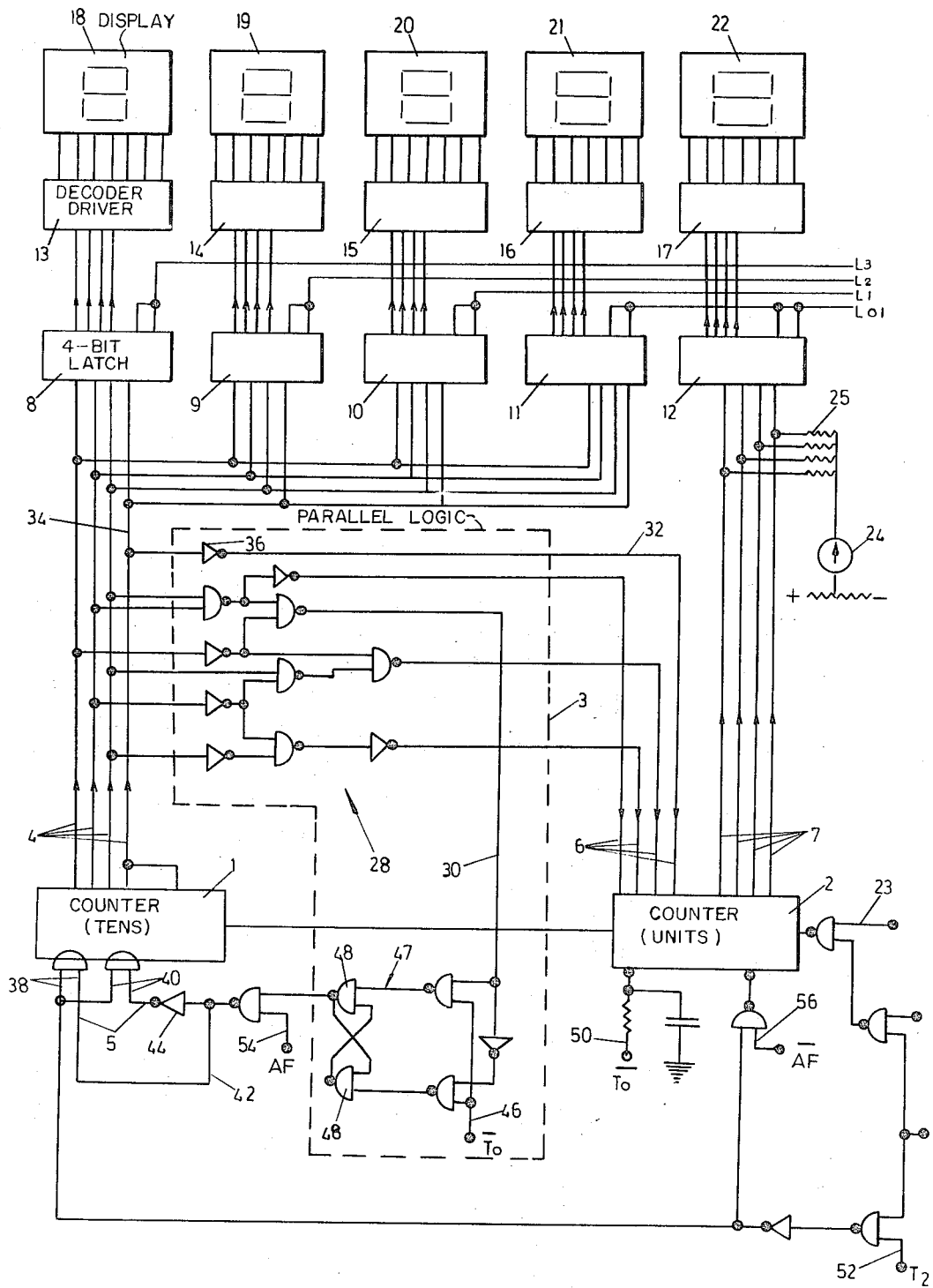

The operation of the invention is described below with reference to the accompanying drawings in which:

FIG. 1 shows a block diagram of an electro-magnetic distance measuring system in which one station includes apparatus according to the invention, and FIG. 2 shows a more detailed block schematic diagram of a part of the apparatus at the lower left of FIG. 1.

In FIG. 1, a master station 100 and remote station 102, are positioned at opposite ends of a line to be measured. At the master station, a microwave carrier is generated by an oscillator 104, such as a klystron, and modulated so that the resulting modulated carrier has the spatial form, when used for measuring, of an electro-magnetic wave at the modulating or pattern frequency. A number of stable pattern frequencies are generated by a crystal oscillator 106. The modulated carrier is sent to the remote station where it is received, processed, and re-transmitted to the master station. Dish antennas 108 direct the microwave signals at each station. The received microwave signal at the master station is heterodyned to a lower intermediate frequency in a mixer, (not shown) with the oscillator 104 acting as the local oscillator, and is then amplified by a tuned amplifier 110. The signal at the output of the amplifier 110 has two components, one representing the phase of the transmitted signal and one the phase of the received signal at the remote station. The two components are detected separately in detectors 112 and 114 and are then passed to a phase comparison circuit 116. This is the arrangement in a conventional Tellurometer such a unit being completed by some form of display to indicate the relative phase of the two components.

In electro-magnetic distance measuring apparatus using the invention, the process of inferring the final distance as described above is done electronically and automatically in the apparatus. In order to effect the required process automatically, an algorithm is needed which can be simply implemented. With pattern frequencies related by powers of ten, and relative phase measured to two digits with an accuracy of better than ±5 percent, such an algorithm requires that a predetermined quantity which may be either four or five be added to a measure to be corrected and that the magnitude of the tens digit of the previous measure obtained using a wave of frequency 10 times that used for the measure to be corrected, be subtracted from that measure. This procedure results in the tens digit of the measure to be corrected being correct. The resulting value of the units digits of this measure is immaterial since the value of the corresponding digit in the result can be obtained from the tens digit of the previous measure. The above algorithm is arranged to operate in modulo 100 arithmetic, which means that any carry to or borrow from a hundreds position is neglected. As is known, in modulo arithmetic, any borrow or carry digits having a significance equal to or greater than the modulo are neglected in obtaining the result. This is the intended meaning of the term in the specification and the claims.

Operation with the above algorithm is most easily effected by presetting a counter to such a value that the final count after accumulating a serial train of pulses the number of which is dependent on the phase to be measured has a corrected tens digit.

Thus, referring again to FIG. 1, the phase comparator 116 provides a pulse train at its output 118, the number of pulses in the train being dependent on the relative phase of the signals from the two detectors. In this particular instrument, the phase comparator generates one hundred pulses for a complete cycle or one pulse for every 3,6 degrees of phase difference between the two signals.

The pulses on line 118 are accumulated in counters 1 and 2, the final count in each counter being transferable to a display unit 120 via lines 4 and 7. In order to correct the value of the final count in counter 1, the counters are preset to a value dependent on the value of the final count in counter 1 for the previous pattern. The preset value of the counters is determined by parallel logic 3, according to the following table, which is based on the algorithm described above, the values to which the counters must be preset for a predetermined quantity of four being indicated in brackets:

| Tens digit of Previous Measure | Value to which counters are preset | |
| --- | --- | --- |
|  | Counter 1 | Counter 2 |
| 0 | 0 (0) | 5 (4) |
| 1 | 0 (0) | 4 (3) |
| 2 | 0 (0) | 3 (2) |
| 3 | 0 (0) | 2 (1) |
| 4 | 0 (0) | 1 (0) |
| 5 | 0 (9) | 0 (9) |
| 6 | 9 (9) | 9 (8) |
| 7 | 9 (9) | 8 (7) |
| 8 | 9 (9) | 7 (6) |
| 9 | 9 (9) | 6 (5) |

For example, with a predetermined quantity of five, if the tens digit of the previous measure was 3, then addition of 5 and subtraction of 3 will result in 2 being added to the measure to be corrected, which is obviously accomplished by presetting the counters to this value before any pulses are accumulated. In the case of the tens digit being greater than 5, 100 units are "borrowed" so that the preset value is not negative. Since this operation is according to module 100 arithmetic, the borrowing operation has no effect on the result.

Referring now to FIG. 2, the counters are two presettable binary coded decimal (BCD) counters. Parallel logic 3 is connected between the output lines 4 of the tens counter and the preset inputs 5 and 6 of the tens and units counters respectively. Inputs to the short term memory elements 8, 9, 10, 11 and 12 are connected to the output lines 4 and 7 of the counters as illustrated. These short term memory elements consist of so called 4-bit latches. The latches drive BCD to seven segment display decoder drivers 13, 14, 15, 16 and 17 which in turn energise seven segment displays 18, 19, 20, 21 and 22 respectively.

Pulse trains as described above are applied to the input 23. A meter 24 connected via a digital to analogue coverter 25 indicates the BCD number appearing on the output lines of the units counter. A timing unit (not illustrated) provides timed pulses to control the sequential operation of the unit.

Generally, operation of the apparatus is as follows:

Pulses from the phase comparator 116, are accumulated in the decimal counters which have previously been preset to a particular value. For the first phase measurement, the counters are preset to zero and the contents, upon completion of the accumulation, are stored in the 4-bit latches, 11 and 12, enabled by the line $L_{01}$ for this purpose. These two digits are thus displayed on the seven segment displays 21 and 22 respectively. The counters are then preset by the parallel logic before the accumulation of the pulses of the next phase measurement, according to the formula 05 minus the tens digit (in the counter 1), as indicated in the above table. Pulses according to the phase of the second measurement are then accumulated in the counters. Upon completion of this accumulation, the tens digit is correct, and is stored in the 4-bit latch 10 which is enabled by $L_1$ for this purpose. It is thus displayed on the seven segment display 20. The counters are again preset to the required quantity dependent on the content of counter 1 and the pulses of the next measurement accumulated, the significant digit being stored in the latch 9 and displayed on the seven segment display 19. Similarly for the most significant digit of the corrected distance which is stored and displayed as before on the latch 8 and the display 18 respectively. Displays and stores for a further two digits are proposed but not illustrated.

Operation of the parallel logic (for a predetermined quantity of five) and the timing unit will now be described in more detail. Referring first to the logic, the gates indicated at 28 perform logical functions to provide logic levels on each of the preset lines 6 and on line 30. They are in fact a realisation of logical equations developed from the above table of preset values against the value of the digit stored in the counter 1 after accumulating a train of pulses. This table is the so called truth table for the operation of the gates 28. For example, it is obvious from the table that the value of the digit to be preset in the counter 2 is odd if the value of the digit in the counter 1 due to the previous train of pulses is even and vice versa. Thus, as far as the least significant bit of the preset lines 6, i.e., the bit appearing on line 32 is concerned, if the least significant bit of the output 4 of the counter 1 which appears on line 34 is binary 1, for example, then line 32 must be binary 0, and vice versa. Therefore the gates must perform a function whereby line 32 is NOT line 34, i.e. the logical equation is:

$$32 = \overline{34}$$

This only requires a buffer or inverter as indicated at 36 to be connected between the two lines. The binary values of the other three of lines 6 are derived in a similar fashion, the logical functions required being more complex than that required for line 32.

As can be seen from the table, the counter 1 must be preset to either BCD 9 or BCD 0 depending on whether the value appearing on the output lines 4 is greater than 5 or not respectively. Line 30 provides the required two different conditions. Counter 1 is preset to either 0 or 9 if either of lines 38 or lines 40 are both binary 1 respectively. With the particular device used, if these conditions are applied simultaneously to lines 38 and 40 an indeterminate state results. This is avoided in that for a particular condition of line 42, opposite conditions are applied to lines 5 due to buffer 44.

During operation of the instrument, the timing unit provides various timed pulses to control the operation of this circuitry. These include pulses at $T_0$ and $T_2$ at the end of each measurement which occur sequentially, and a pulse AF at the beginning of each complete set of measurements. Thus at the end of a measurement, $T_0$ occurs. This pulse is inverted to give $\overline{T_0}$ which when applied to line 46, causes the condition on line 30 to be stored in the one-bit latch indicated at 47 formed by NAND gates 48, and when applied to line 50 causes the counter 2 to be preset to a value corresponding to the condition of lines 6. Subsequent occurrence of a pulse at $T_2$ which is applied to line 52 causes the counter 1 to be preset to either 0 or 9 depending on the condition of the one-bit latch 47. The delay in presetting the counter 1 is required so that the conditions on the lines 6 will not change while the counter 2 is being preset. The AF pulse at the beginning of a set of measurements, when applied to line 54 and inverted to line 56 causes the counters to be preset to zero, in preparation for the new measurements.

The timing unit also provides pulses in lines $L_{01}$, $L_1$, $L_2$ and $L_3$ to control the storing of the outputs of the counters in the latches at appropriate times in the sequence of operations of the circuit.

The operation of the equipment of the invention will now again be described but with reference to the example given above, i.e., where the actual distance to be measured is 99,000 metres and using a predetermined quantity of five.

The counters are preset to zero and the pulses of the first phase measurement are accumulated. There are no pulses for the first measurement and thus the content of the counters is 00, and this is stored and displayed as described above. It can easily be seen that had 100 pulses been accumulated, the result would have been identical, the carry digit of 1 having no significance for the counters and only the tens and units in the total being significant. The parallel logic now preset the counters to 05 minus the tens digit, (0), that is, it presets the counters to 05. The pulses of the second measurement are now accumulated. There are 95 of them which together with the 05 to which the counters were preset, gives a total of 100 counts and 00 in the counters, the carry or overflow digit of 1 being neglected as it has no significance. The tens digit, (0), is correct and is stored and displayed as described above. The counters are once again preset to 05 minus the tens digit, (0), that is to 05. The pulses of the third measurement are now accumulated. They total zero and the accumulated content of the counters is thus 05. The tens digit, (0), is correct and is stored and displayed as previously described. The counters are once again preset to 05, this being 05 minus the tens digit, (0), and the pulses of the fourth measurement are accululated. They total 4 and the accumulated content of the counters is thus 09. The tens digit, (0), is correct and is stored and displayed as previously described. To complete the series of measurements in this example the two additional digits would be required and the description will assume their availability. The counters are preset to 05 once again and the pulses of the fifth measurement are accumulated. They total 85 and the accumulated content of the counters is thus 90. Thus 9 is stored and displayed as previously described. The counters must now be preset to 05 minus the tens digit, (9), that is to 96 as indicated in the above table. The 3 pulses of the sixth measurement are accumulated to give a counter content of 99. The tens digit (9) is correct and is stored and displayed as before.

In the case of all measurements but the first, the digit contained in the units counter upon completion of the accumulation will be 5 plus the percentage phase error. Thus a meter connected to the output of this counter via a digital to analogue converter can be calibrated in terms of this error and will give an indication of the confidence which can be placed in the particular measurement.

We claim:

1. A device for processing phase measurements obtained from electro-magnetic distance measuring apparatus yielding successive phase difference measurements each having one digit with the same significance as the current most significant digit in a partial measure of the distance and one digit of greater significance than that digit to indicate the final distance, comprising means to accept measurements from the measuring apparatus, means to accumulate those measurements and after the first measurement to add in a modulo corresponding with the number of digits in a phase measurement and at the weight of the current most significant digit in the partial measure a correcting quantity to each measurement to allow for error in the measurement, means to control the accumulating means so that correcting quantity is a predetermined quantity minus the current most significant digit in the partial measure of distance, and means to indicate the final distance.

2. A device as claimed in claim 1 in which the predetermined quantity is four.

3. A device as claimed in claim 1 in which the predetermined quantity is five.

4. A device as claimed in claim 1 in which the accumulating means is a counter to count a serial train of pulses representing a phase difference.

5. A device as claimed in claim 4 in which the counter is a two digit decimal counter.

6. A device as claimed in claim 4 in which the controlling means is digital logic which presets the accumulating means to a value corresponding to the correcting quantity before a phase measurement is accumulated so that the correcting quantity is added to the measurement.

7. A device as claimed in claim 1 in which the indicating means is a visual display.

8. A device as claimed in claim 1 in combination with electro-magnetic distance measuring apparatus.

9. A device as claimed in claim 6 in combination with electro-magnetic distance measuring apparatus.

* * * * *